March 6, 1951  R. C. DYE  2,543,902
RADIO FREQUENCY VOLTAGE SUPPLY

Filed Feb. 15, 1950  2 Sheets-Sheet 1

WITNESSES:
Ralph Cahl Smith
Gene C. Newlin

INVENTOR:
Raymond C. Dye
BY Roland A. Anderson
Attorney

March 6, 1951  R. C. DYE  2,543,902
RADIO FREQUENCY VOLTAGE SUPPLY
Filed Feb. 15, 1950  2 Sheets-Sheet 2

WITNESSES:

INVENTOR:
Raymond C. Dye
BY
Roland A. Anderson
Attorney

Patented Mar. 6, 1951

2,543,902

UNITED STATES PATENT OFFICE 2,543,902

RADIO FREQUENCY VOLTAGE SUPPLY

Raymond C. Dye, Los Angeles, Calif., assignor to the United States of America as represented by the United States Atomic Energy Commission Application February 15, 1950, Serial No. 144,368

6 Claims. (Cl. 321—2)

This invention relates to a high voltage power supply of the radio-frequency oscillator type, and more particularly to a high voltage power supply having improved self-regulation characteristics.

Radio-frequency high voltage power supplies of the general type to which this invention applies have been described in U. S. Patents 2,300,451 and 2,374,781. While power supplies of the prior art are useful in the range of from 500 volts to 50 kilovolts, it has been found that improved voltage regulation under changing load conditions is a necessity in certain critical applications. The difficulty in obtaining good voltage regulation in high voltage radio-frequency supplies arises from the fact that a very small current change represents a sufficient power difference to cause the oscillation feed-back coupling to vary from the optimum state to such an extent that the radio-frequency oscillator fails to maintain the output voltage within acceptable limits.

It is an object of this invention, therefore, to provide a self-regulating power supply source of high voltage which utilizes a single tube oscillator circuit and rectifier.

Another object of this invention is to provide a power supply source of high voltage employing a multi-grid oscillator tube in which the potential on the screen grid of the tube varies with change in output load in such a manner as to provide exceptionally good stabilization of output voltage.

It is a further object of this invention to provide a power supply source of high voltage which is light in weight, small in physical size and requires a minimum of circuit components.

Other objects and advantages of the present invention will be apparent from the following specification taken in connection with the drawings which are made a part hereof and also in the description of a preferred embodiment.

Figure 1:
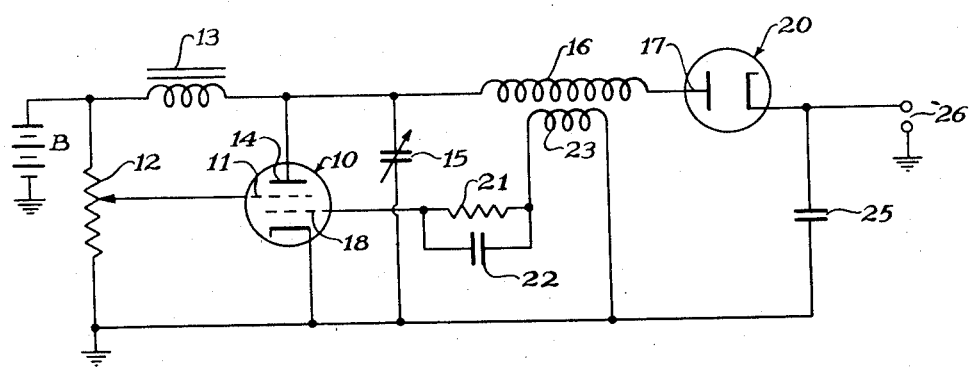
Figure 1 is a schematic diagram of a radio-frequency high voltage power supply arranged in accordance with this invention.

Referring to Figure 1, tetrode type tube 10 is employed as the oscillator power tube. It has been found that it is advantageous to utilize a beam power tetrode because of its inherent high effective plate resistance and its low-level required driving power. The oscillator energy excitation source is any suitable direct current low voltage supply shown for purpose of illustration by the battery designated B. The correct operating potential for screen grid 11 is obtained from a tap on resistor 12 connected between the B+ potential and ground. A radio-frequency blocking inductor 13 is connected between anode 14 of tube 10 and the battery B+. Variable condenser 15 provides a power match between tube 10 and a resonant tank circuit. The tank coil 16 is connected between anode 17 of tube 20 and anode 14 of tube 10. The circuit of the control grid 18 of tube 10 consists of a time-constant circuit comprising a resistor 21 and shunt connected condenser 22 and the secondary winding 23. Secondary winding 23 is inductively coupled to anode tank coil 16, thus constituting feed-back means for coupling the anode-cathode and control grid-cathode circuits to cause the vacuum tube 10 to generate oscillations. The control grid circuit can be thought of as relaxation oscillator of the grid blocking type due to the periodic charge and discharge of condenser 22 of the time constant circuit.

Figure 2:
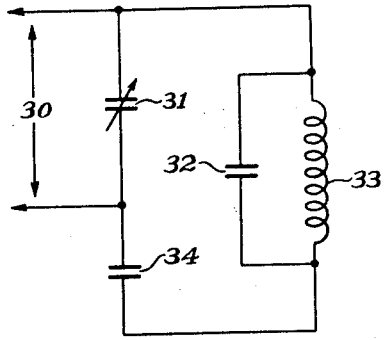
Figure 2 is a simplified equivalent schematic diagram of Figure 1.

Considering now the operation of the circuit, reference is made to Figure 2 which is an equivalent circuit of Figure 1.

The equivalent circuit may be thought of as a series resonant circuit having a coil 33 of fairly large inductance shunted with a small distributed capacity 32, resonated with shunted connected small capacitor 31 and small series capacitor 34 which represents the capacitance of diode 20. Capacitor 31 is the shunt capacitance of the circuit including capacitor 15 of Figure 1 which appears across the oscillator tube and is made fairly large to match the impedance between the series resonant circuit and the oscillator.

The power generated by tube 10 of Figure 1 is shown as applied at the generator source 30. This radio-frequency power is in the form of current pulses typical of class C operation, i. e., the bias is made greater than the cut off value corresponding to the anode supply voltage. Under these conditions, the anode current flows in pulses that last for less than a half cycle. Class C operation is utilized in order to obtain high anode efficiency. The power from source 30 is fed directly to capacitor 31 which is equivalent to the sum total of all capacitances in shunt with the generator tube 10. The capacitance 31 presents an impedance match to generator 10.

The oscillator with matching capacitance 31 presents a source from which the transfer of power is not affected by load changes except where the change causes an appreciable mismatch between the load and the effective impedance across the terminals of capacitor 31. Further, this effect is held to a very small value in the circuit since the impedance of capacitor 34, which is that of diode 20, is very large at the operating frequency compared to the load resistance. For example, a change in impedance in the load circuit of 50 per cent will cause a transfer loss due to mismatch of less than one per cent.

With the operation of the equivalent circuit of Figure 2 in mind reference is made to Figure 1. Assuming that the proper potentials are applied, tube 10 will oscillate in the normal manner. The feed-back winding 23 drives control grid 18 positive on oscillation peaks so that condenser 22 is charged by rectifier action and thereby establishes the requisite grid bias. The grid-leak network, together with coil winding 23, is chosen to give proper bias for efficient Class C operation. The radio-frequency voltage produced at anode 14 feeds condenser 15 which then supplies power to the tank circuit. The radio-frequency high voltage, developed across coil 16 due to the resonance of the circuit, swings anode 17 of diode 20 above ground on each positive half cycle causing it to conduct current and to rapidly charge condenser 25 to the nominal output voltage. The tank circuit consisting of coil 16 and its stray capacitance connected to anode 14 of tube 10 may be thought of as a pulse-type high voltage source and its operation is based on the periodic interruption of anode current through the inductance of coil 16.

Diode type tube 20 is electrically connected between tank coil 16 and condenser 25 in order to rectify the high voltage radio-frequency that appears across coil 16, thereby producing a direct current output at terminals 26.

Figure 3:
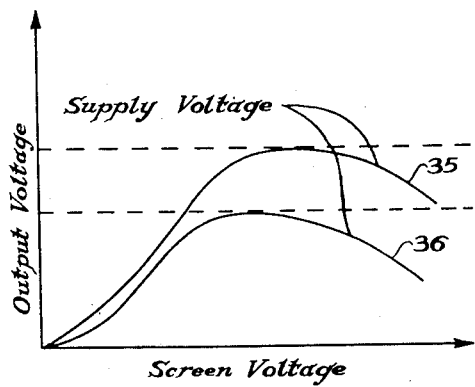
Figure 3 is a set of curves to illustrate the operation of the circuit of Figure 1.

The operation of the circuit of the invention as controlled by the self-regulation feature is shown graphically in Figure 3 in which the screen voltage is plotted as the abscissa against the output voltage as the ordinate. The two curves 35 and 36 represent two different anode supply voltages. An increase in screen voltage gives an increase in output voltage until the swing of the anode goes below the screen voltage, causing the screen to limit the anode current and consequently the power transferred to the tank circuit. Thus the output voltage levels off as the screen limits the available anode power below that required to support the tank circuit losses. Curves 35 and 36 illustrate that the screen voltage may be set at a value represented by the flat portion of the curve and any additional power required for an increased load on the tank circuit will be obtained by screen voltage regulation without lowering the output voltage.

Figure 4:
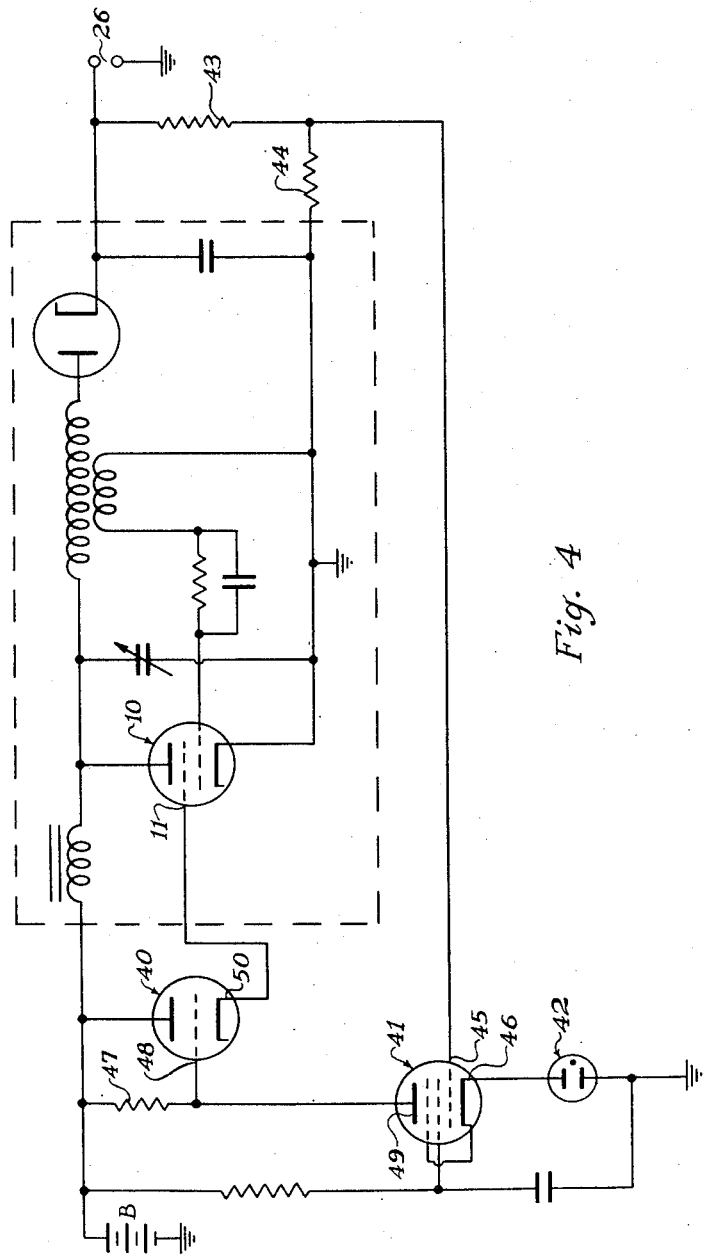
Figure 4 is a schematic diagram illustrating a means of regulating the rectified output voltage of the circuit of Figure 1.

Referring to Figure 4, a preferred embodiment of this invention is shown employing the circuit of Figure 1 in which an automatic voltage regulator is used. The voltage regulator, in addition to the circuit of Figure 1, employs three tubes, 40, 41 and 42 with circuit components. A tap taken between resistors 43 and 44, which are connected between the positive output terminal 26 and ground, is connected to control grid 45 of tube 41. Tube 41 is held above ground by a glow type voltage regulator tube 42 which is connected between the cathode 46 and ground. Resistor 47, connected between the battery B+ and control grid 48 of tube 40 and the anode 49 of tube 41, is selected so that the screen-grid voltage on tube 10 will have a value lying on the linear portion of the operating curve of Figure 3. Any decrease in output voltage will cause a decrease in current through tube 41, thus raising the control grid 48 of series tube 40. The rise on grid 48 of tube 40 causes a rise on cathode 50 and the screen-grid 11 of tube 10 and this in turn raises the output voltage to the required level.

From the foregoing description of this invention, it will be evident that a power supply embodying the invention provides a simple and inexpensive electronic apparatus for producing a high source of potential developed from a low voltage source. It will further be seen that what has been described herein is a simple radio-frequency high voltage power supply featuring, in addition, self-regulation at very high voltages.

It will thus be apparent to those skilled in the art that this invention is by no means limited to the particular organization shown and described but that many modifications may be made without departing from the scope of this invention as set forth in the appended claims.

What is claimed is:

1. A radio frequency high voltage generator comprising a vacuum tube having at least an anode, cathode, screen grid and control grid; a transformer having a primary and a secondary winding; a rectifier having a pair of terminals and a capacitor serially connected together and connected in series with the transformer primary winding and the cathode-anode interelectrode space of said vacuum tube; a resistor-capacitor network having a selected time constant connected serially with the transformer secondary winding and the cathode-grid interelectrode space of said vacuum tube; a variable capacitor connected in shunt with the cathode-anode interelectrode space of said vacuum tube; a source of anode potential connected in series with a choke coil and the cathode-anode interelectrode space; a source of positive potential connected to said screen grid, and an output terminal connected to one of said rectifier terminals and a second output terminal connected to the vacuum tube cathode.

2. A radio frequency high voltage generator comprising a vacuum tube having at least a cathode, grid, accelerating grid and an anode; a step-up transformer having a primary, and a secondary winding inductively coupled to said primary; a diode rectifier, a first capacitor, means electrically connecting in series the cathode-anode interelectrode space of said vacuum tube, the primary winding, the diode and the capacitor; a resistor-capacitor shunt network, means electrically connecting in series the vacuum tube cathode-grid interelectrode space, the network and the secondary winding; a second capacitor, means electrically connecting the second capacitor in shunt with the cathode-anode interelectrode space of said vacuum tube; a source of potential having a positive and a negative pole, means for blocking energy of the frequency of generation of said generator electrically connecting said potential source positive pole to the vacuum tube anode, means for impressing a positive potential on the vacuum tube accelerating grid and means for electrically connecting the potential source negative pole to the vacuum tube cathode.

3. A radio frequency high voltage generator comprising a radio frequency transformer having a primary and secondary winding; a vacuum tube having at least a cathode, grid, accelerating grid and an anode; a resistor-capacitor shunt network; means electrically connecting the vacuum tube cathode-grid interelectrode space, the network and the secondary winding in series; a diode having an anode and a cathode, a fixed capacitor; means electrically connecting one end of the primary winding to the vacuum tube anode and the other end to the diode anode; means electrically connecting the capacitor in series with the diode cathode and the vacuum tube cathode; an output terminal connected to said diode cathode and a second output terminal connected to the vacuum tube cathode; a radio frequency blocking choke electrically connecting the vacuum tube anode to a source of positive potential, and means for impressing a positive potential on said accelerating grid.

4. A radio frequency high voltage generator comprising a vacuum tube having at least an anode, cathode, screen grid and control grid; a transformer having a primary and secondary winding; a rectifier having a pair of terminals and a capacitor serially connected together and connected in series with the transformer primary winding and the cathode-anode interelectrode space of said vacuum tube; a resistor-capacitor network having a selected time constant connected serially with the transformer secondary winding and the cathode-grid interelectrode space of said vacuum tube; a variable capacitor connected in shunt with the cathode-anode interelectrode space of said vacuum tube; a source of anode potential connected in series with a choke coil and the cathode-anode interelectrode space; a source of positive potential connected to said screen grid, and an output terminal connected to one of said rectifier terminals and a second output terminal connected to the vacuum tube cathode, and means for varying the value of said source of positive potential connected to said grid in a direction opposite to variations in potential on said first mentioned output terminal whereby the potential across said output terminals is stabilized.

5. A radio frequency high voltage generator comprising a vacuum tube having at least a cathode, grid, accelerating grid and an anode; a step-up transformer having a primary, and a secondary winding inductively coupled to said primary; a diode rectifier, a first capacitor; means electrically connecting in series the cathode-anode interelectrode space of said vacuum tube, the primary winding, the diode and the first capacitor; a resistor-capacitor shunt network, means electrically connecting in series the vacuum tube cathode-grid interelectrode space, the network and the secondary winding; a second capacitor, means electrically connecting the second capacitor in shunt with the cathode-anode interelectrode space of said vacuum tube; a source of potential having a positive and a negative pole, means for blocking energy of the frequency of generation of said generator electrically connecting said potential source positive pole to the vacuum tube anode, means including a cathode follower for impressing a positive potential on the vacuum tube accelerating grid and means for electrically connecting the potential source negative pole to the vacuum tube cathode, said cathode follower having a cathode, grid and anode, said cathode follower cathode being electrically connected to the vacuum tube accelerating grid, said cathode follower anode being electrically connected to said potential source positive pole, a source of bias potential connected to the cathode follower grid and means responsive to variations in potential across said first capacitor for varying the bias potential on the cathode follower grid to stabilize the potential across said first capacitor.

6. A radio frequency high voltage generator comprising a radio frequency transformer having a primary and secondary winding; a vacuum tube having at least a cathode, grid, accelerating grid and an anode; a resistor-capacitor shunt network; means electrically connecting the vacuum tube cathode-grid interelectrode space, the network and the secondary winding in series; a diode having an anode and a cathode, a fixed capacitor; means electrically connecting one end of the primary winding to the vacuum tube anode and the other end to the diode anode; means electrically connecting the capacitor in series with the diode cathode and the vacuum tube cathode; an output terminal connected to said diode cathode and a second output terminal connected to the vacuum tube cathode; a radio frequency blocking choke electrically connecting the vacuum tube anode to a source of positive potential, and means for impressing a positive potential on said accelerating grid including a grid controlled amplifier tube and grid controlled cathode follower, said grid controlled amplifier vacuum tube having at least a cathode, grid and anode, a glow discharge tube connected effectively between the grid controlled amplifier tube cathode and the second output terminal; an anode load resistor connected between the grid controlled amplifier tube anode and the source of positive potential; a voltage divider electrically connected effectively across the output terminals and having a tap connection; means electrically connecting the grid of said amplifier tube to said tap connection, said cathode follower having its cathode electrically connected to the vacuum tube accelerating grid, its grid connected to the junction of the amplifier anode and the anode load resistor, and its anode connected to said source of positive potential; whereby the output voltage across the output terminals is stabilized.

RAYMOND C. DYE.

No references cited.